United States Patent Office 2,761,787
Patented Sept. 4, 1956

2,761,787

DESTATICIZATION OF PLASTIC ARTICLES

Richard G. Rowe, Redding Ridge, and Guiles Flower, Jr., Darien, Conn., assignors to Dictaphone Corporation, Bridgeport, Conn., a corporation of New York No Drawing. Application April 11, 1952, Serial No. 281,906

7 Claims. (Cl. 106—37)

This invention relates to the production of synthetic plastic compositions having improved anti-static and internal lubrication properties. The compositions of the present invention are especially useful as media to be employed in recording sound and will be illustratively described in connection with such use, although as the description proceeds it will become apparent that they may be used for other purposes as well, such as, for example, in sheet form as wrappings for various articles and in bulk form to make any of a variety of molded objects that are currently made of such plastics.

Plastic sound recording media have been extensively used for some years in at least two major fields, namely, in the manufacture of phonograph records and as recording media in dictating machines wherein they may be used in the form of discs, sheets, endless belts or in other forms. One problem encountered in connection with the use of plastics as recording media arises out of the tendency of the surface of the plastic to acquire a static charge as the recording or reproducing stylus passes thereover. This static charge causes dust to be attracted to and accumulate in the grooves cut by the stylus. The dust works its way into the grooves of the records from which it is very difficult to remove. An accumulation of dust and grit remaining in the grooves increases the noise level and tends to produce an abrasive action on the record grooves thereby causing undue wear of the grooves and distortion of the sound reproduction.

In some cases recording is effected on a very thin sheet of plastic. For example, endless belts for dictating machines may be made of a material that is of the order of 0.005 inch thick. It has been found that over a period of time the surface of the plastic belt hardens to such an extent that when the stylus is applied thereto to make a recording, there is a tendency for the relatively thin belt to be gouged or torn. This tendency to tear because of surface hardening can be overcome by applying a layer of wax to the belt. However, the application of such a wax layer is not an entirely satisfactory solution of the problem since it involves a separate manufacturing step and thereby increases the cost of manufacture of the belt.

It is a general object of the present invention to provide a plastic composition having improved anti-static and internal lubrication properties. It is another object of the invention to provide a sound recording medium having recording grooves that do not attract dust. It is another object of the invention to provide a plastic sound recording medium in thin sheet form and that is more resistant to tearing than the untreated plastic sheets heretofore available for this use. Other objects of the invention will be in part obvious and in part pointed out hereafter.

In one of its broader aspects the composition of the present invention comprises a synthetic organic plastic containing a minor proportion of a reaction product of stearic acid and aminoethylethanolamine, specifically, 2-heptadecyl 2-imidazoline 1-ethanol. It has been found that when this compound is added to a plastic under the proper conditions in amounts up to 10% by weight of the plastic it not only reduces the tendency of the plastic to accumulate static charges but also acts as a secondary plasticizer or internal lubricant to reduce the brittleness of the plastic, improve its flexibility and decrease the tendency of the plastic to tear when in thin sheet form. The imidazoline is a known compound and can be prepared in known manner by heating a mixture of stearic acid and aminoethylethanolamine to cause these two reactants to condense to form the imidazoline.

The optimum amount of imidazoline to be added to the plastic depends upon a number of factors. In the first place, it has been found that the compatibility of the imidazoline with various plastics varies according to the nature of the plastic. Thus, the extent to which the imidazoline can be compatibly incorporated in the plastic constitutes an upper limit to the amount of the imidazoline that can be practically used. Moreover, it has been found that the quantity of imidazoline in the plastic that gives optimum anti-static properties differs somewhat from that which gives optimum secondary plasticizing action. In general, in order to secure optimum anti-static activity a somewhat higher concentration of the imidazoline should be used than in cases where optimum lubrication is desired. In most cases it is preferable to compromise and select an imidazoline concentration that produces a desirable improvement in both anti-static activity and internal lubrication. This compromise value usually falls between 2 and 5% by weight of the plastic.

The imidazoline may be incorporated in the plastic in any of various ways. Ordinarily the present plastic composition will include not only a synthetic resin and the imidazoline but also minor proportions of various other constituents that improve the moldability of the composition. For example, the composition may contain waxes, metallic soaps, coloring matter and other known constituents of molding powders.

To illustrate one satisfactory general method of incorporating the imidazoline in the plastic composition, it may be pointed out that one commonly used and well known conventional procedure for making a molding powder involves blending the components of the molding composition in powder form in a ribbon blender or tumbling drum, and thereafter transferring them to a Banbury mixer wherein they are heated and milled for a further period to convert them into a homogeneous mixture. The mixture is removed from the Banbury mixer in a plastic condition at a temperature of the order of 120° to 180° C., and then formed into sheets or ribbons, cooled and broken up into granules which are subsequently used for molding.

The imidazoline may be added in powder form to the powdered synthetic resin in the blender prior to, during or after the addition of the other components of the molding powder, or it may be added to the other materials in the Banbury mixer or milled into the molding composition after the other ingredients have been incorporated therein. Also, the resin and imidazoline can be dissolved in a suitable solvent such as acetone and the solvent evaporated to give the desired mixture of resin and imidazoline.

In order to point out more fully the nature of the present invention the following specific examples are given of illustrative ways of preparing the present plastic composition and the properties of the products thus produced.

*Example 1*

A vinyl molding composition was prepared in the following manner: 1372 parts by weight of a finely-divided co-polymer containing 87% vinyl chloride and 13% vinyl acetate and designated as VYHH were placed in a ribbon blender and 42 parts by weight of 2-heptadecyl 2-imidazoline 1-ethanol were added to the blender and mixed therein with the vinyl resin for a period of about ten minutes. At this time 7 parts by weight of fused lead stearate and 21 parts by weight of oiled carbon black (Spheron A) were added and mixing continued for another ten minutes.

On completion of the mixing the batch was transferred to a Banbury mixer and milled for approximately three minutes. The mixer was heated to a temperature sufficient to fuse the mixer and cause it to attain a temperature of 130° C.–140° C. Upon removal from the Banbury mixer the material was passed four times through a two-roll even-speed mill after which the material was sheeted out on a cooling belt in the form of a continuous ribbon ¼" thick. The ribbon was cooled with air at an average temperature of 10° to 15° C. After cooling the material was broken into small slabs and then ground in a Ball and Jewell cutter which granulated it to produce molding particles having a size up to ⅜". (If desired, the granulated material can be passed over Alnico magnets to remove any tramp metal which may be present.)

A portion of the resulting molding powder (about 135 grams) was molded into a 12" phonograph record blank in a steam-heated mold supplied with steam under a pressure of 60 lbs. per square inch. Molding was effected at a temperature of 140° to 150° C. and a pressure of 2500 lbs. per square inch for a period of twenty-three seconds after which the mold was cooled for thirty seconds with cooling water at 15° to 20° C.

The phonograph record made as described above was tested for anti-static activity in the following manner: In general, the anti-static activity was determined by measuring the ability of the record to attract cigarette ashes. The record was rubbed briskly with a dry cotton cloth six or eight times, then held near the top of a vertically-arranged six-inch ruler above a quantity of cigarette ashes distributed on a sheet of paper. The record was gradually and steadily lowered toward the cigarette ashes and the maximum height at which the ashes were attracted to the record was noted. It was found that at a relative humidity of 59% a record prepared as described above could be lowered into contact with cigarette ashes without lifting them from the paper, whereas, a record prepared in a similar manner but without the addition of the imidazoline attracted ashes at a height of one inch under the same test conditions.

*Example 2*

A lacquer was prepared by dissolving 20 parts by weight of cellulose acetate butyrate molding pellets in a solvent comprising 11.4 parts by weight of methanol, 26.7 parts by weight of acetone, 2.7 parts by weight of diacetone alcohol, and 38.1 parts by weight of denatured ethyl alcohol S. D. No. 1. The lacquer was heated to a refluxing temperature and 1 part by weight of 2-heptadecyl 2-imidazoline 1-ethanol in powder form was added thereto with stirring.

Plastic belts were cast from the lacquer by applying the lacquer to the interior surface of a cylindrical glass mold, causing the solvent to evaporate to leave a thin plastic film in cylindrical form, and stripping the film from the glass surface. A belt cast in this way was tested by the cigarette ash test described in Example 1 and showed no attraction for cigarette ashes.

*Example 3*

85 parts by weight of cellulose acetate butyrate in flake form, 15 parts by weight of di-octyl phthalate, and 2 parts by weight of 2-heptadecyl 2-imidazoline 1-ethanol were dry mixed and then further mixed on a roll mill at 350° F., after which they were passed through a pelletizing machine at 350°–360° F. The resulting pellets were extruded at a temperature of about 360° F. and a rate of about 60 lbs./hr. as a continuous tube having a wall thickness of 0.006 inch and a circumference of 12 inches. The tube was cut into belts 3½ inches wide.

The belts made in accordance with the described procedure were found to have excellent sound recording characteristics and a resistance to tearing comparable with that of the previously available waxed belts. Their anti-static properties were only slightly better than belts of the same compositions containing no imidazoline.

*Example 4*

Belts were made according to the procedure of Example 3 except that 5 parts by weight of imidazoline were used instead of 2 parts by weight as in Example 3. These belts showed a substantial improvement in anti-static properties but were somewhat inferior to the belts of Example 3 in certain of their sound recording characteristics.

From the foregoing examples it is apparent that by incorporating suitable amounts of 2-heptadecyl 2-imidazoline 1-ethanol in a plastic the anti-static properties and/or internal lubrication of the plastic is improved. In general, the optimum anti-static properties are achieved as the concentration of imidazoline approaches the point at which it becomes incompatible with the plastic composition. Optimum internal lubrication is generally achieved at a concentration somewhat lower than that which gives optimum anti-static activity.

It is of course to be understood that the foregoing examples are illustrative only and that numerous changes may be made in the procedure, materials and proportions described without departing from the spirit of the invention as defined in the appended claims.

We claim:

1. A plastic composition having improved anti-static and internal lubrication properties comprising a synthetic organic plastic selected from the group consisting of cellulose butyrate acetate and copolymers of vinyl chloride and vinyl acetate, and a small amount not exceeding 10% by weight and sufficient to impart anti-static properties to said plastic of 2-heptadecyl 2-imidazoline 1-ethanol.

2. A plastic composition having improved anti-static and internal lubrication properties comprising a copolymer of vinyl chloride and vinyl acetate containing a small amount not exceeding 10% by weight and sufficient to impart anti-static properties to said plastic of 2-heptadecyl 2-imidazoline 1-ethanol.

3. A plastic composition having improved anti-static and internal lubrication properties comprising cellulose butyrate acetate containing a small amount not exceeding 10% by weight and sufficient to impart anti-static properties to said plastic of 2-heptadecyl 2-imidazoline 1-ethanol.

4. A plastic composition having improved anti-static and internal lubrication properties comprising cellulose butyrate acetate containing about 2% by weight of 2-heptadecyl 2-imidazoline 1-ethanol.

5. A sound recording form comprising a synthetic organic plastic selected from the group consisting of cellulose butyrate acetate and copolymers of vinyl chloride and vinyl acetate, said plastic containing a small amount not exceeding 10% by weight and sufficient to impart anti-static properties to said plastic of 2-heptadecyl 2-imidazoline 1-ethanol.

6. A phonograph record comprising a co-polymer of vinyl acetate and vinyl chloride containing 2-heptadecyl 2-imidazoline 1-ethanol in an amount up to 10% by weight sufficient to impart anti-static properties to said record.

7. An endless belt adapted to be used for sound recording purposes, said belt being a thin sheet composed of cellulose butyrate acetate containing about 2% by weight of 2-heptadecyl 2-imidazoline 1-ethanol.

References Cited in the file of this patent

UNITED STATES PATENTS

| | | |
|---|---|---|
| 2,306,440 | Hentrich | Dec. 29, 1942 |
| 2,307,180 | Yngve | Jan. 5, 1943 |
| 2,376,743 | Wendt | May 22, 1945 |
| 2,540,170 | Law | Feb. 6, 1951 |